L. ONDERDONK.
Ruffling and Plaiting Attachment for Sewing Machines.

No. 231,844. Patented Aug. 31, 1880.

Witnesses:

Inventor:
Lansing Onderdonk by
Duell Wells & Duell
his Atty

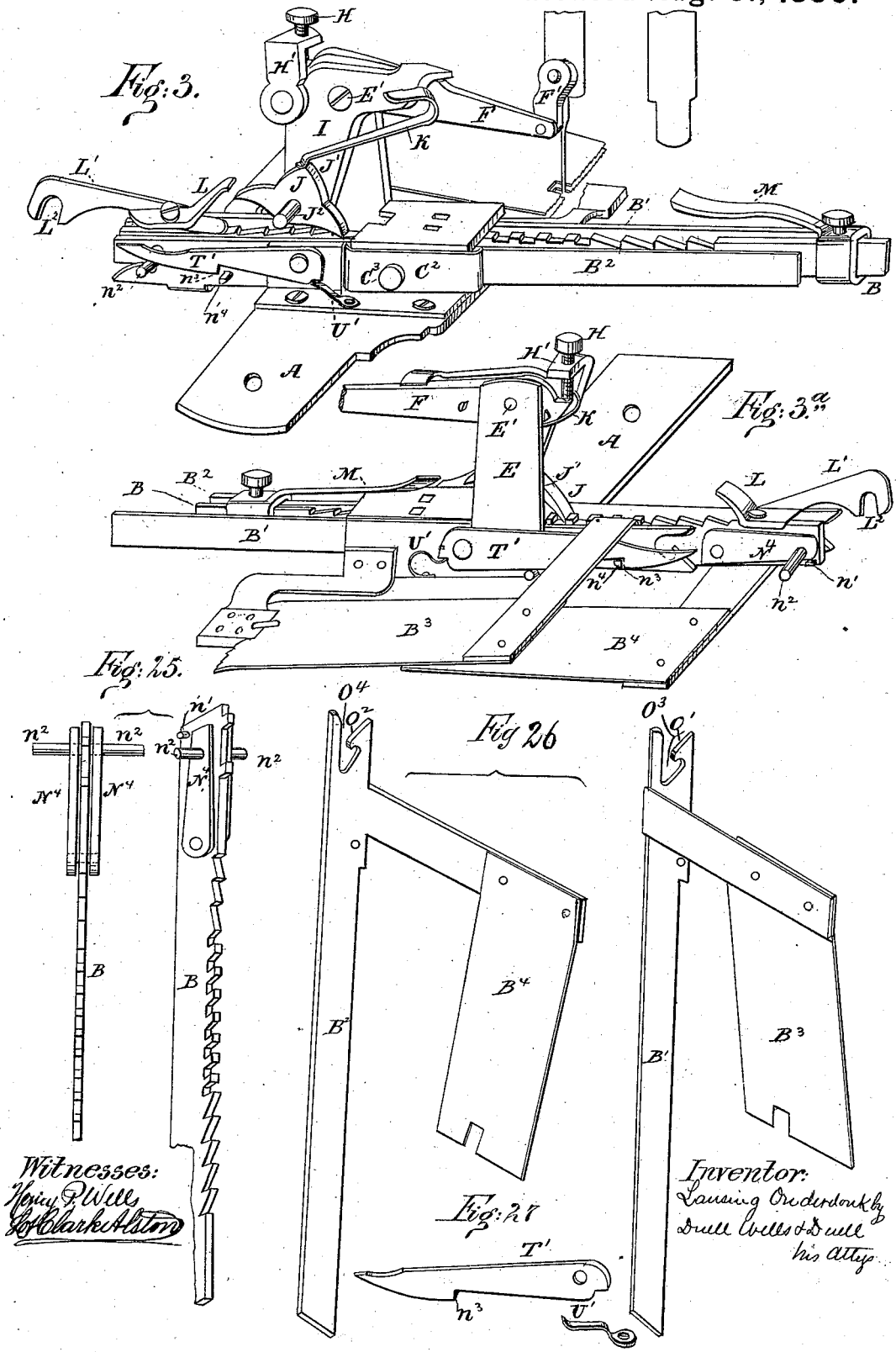

L. ONDERDONK.
Ruffling and Plaiting Attachment for Sewing Machines.
No. 231,844. Patented Aug. 31, 1880.
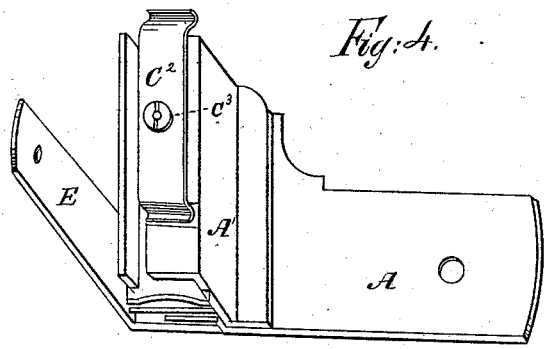
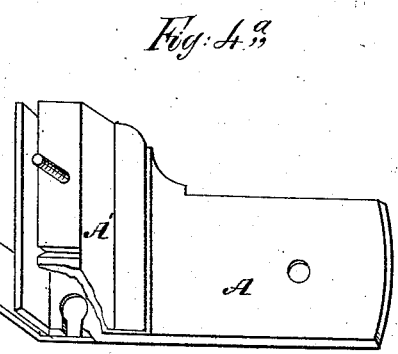
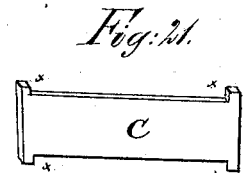
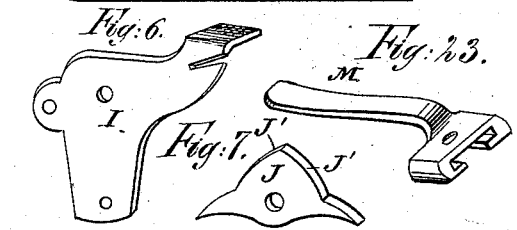
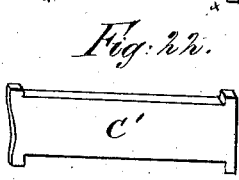
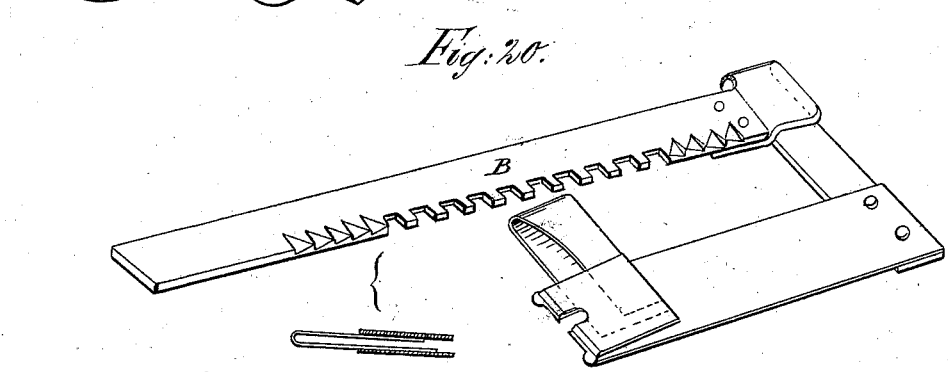
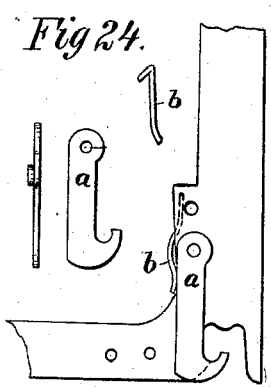

L. ONDERDONK.
Ruffling and Plaiting Attachment for Sewing Machines.
No. 231,844. Patented Aug. 31, 1880.
Fig: 8ª
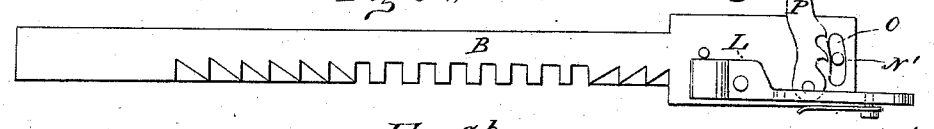
Fig: 8ᵇ
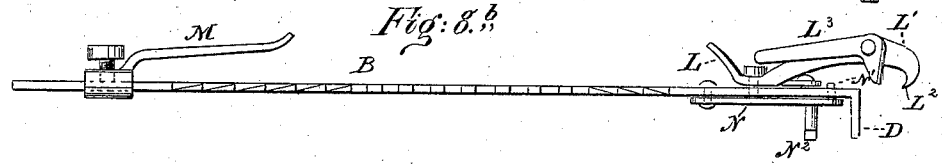
Fig: 8ᶜ
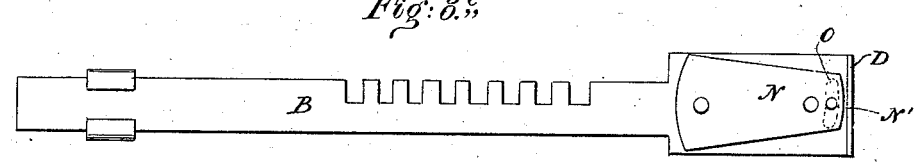
Fig: 9ª
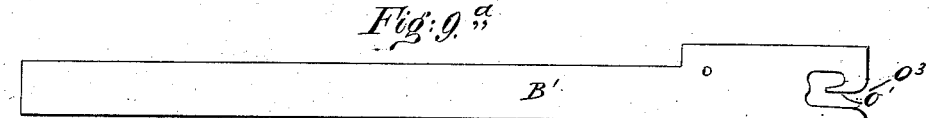
Fig: 9ᵇ
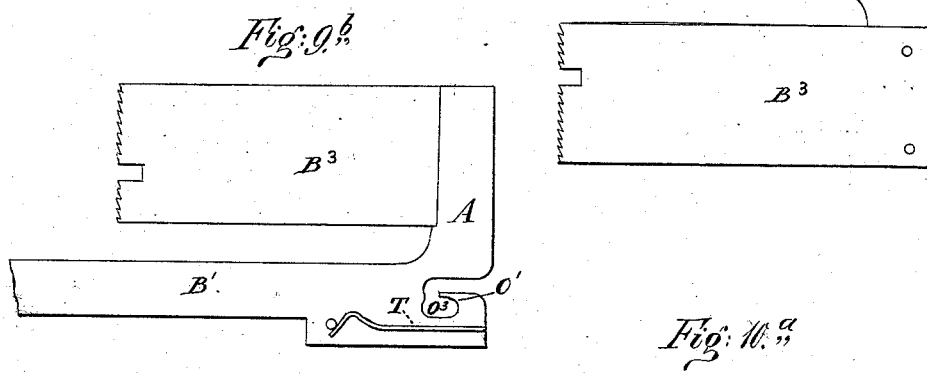
Fig: 10ª
Fig: 10ᵇ
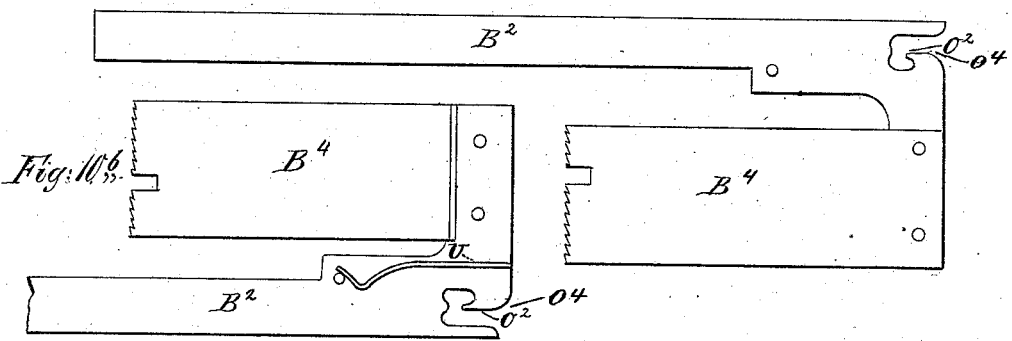
Fig: 15.
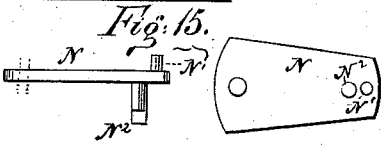
Witnesses:
Henry P. Wells
Geo. H. Clark Alston
Inventor:
Lansing Onderdonk by
Duell Wells & Duell
his Attys

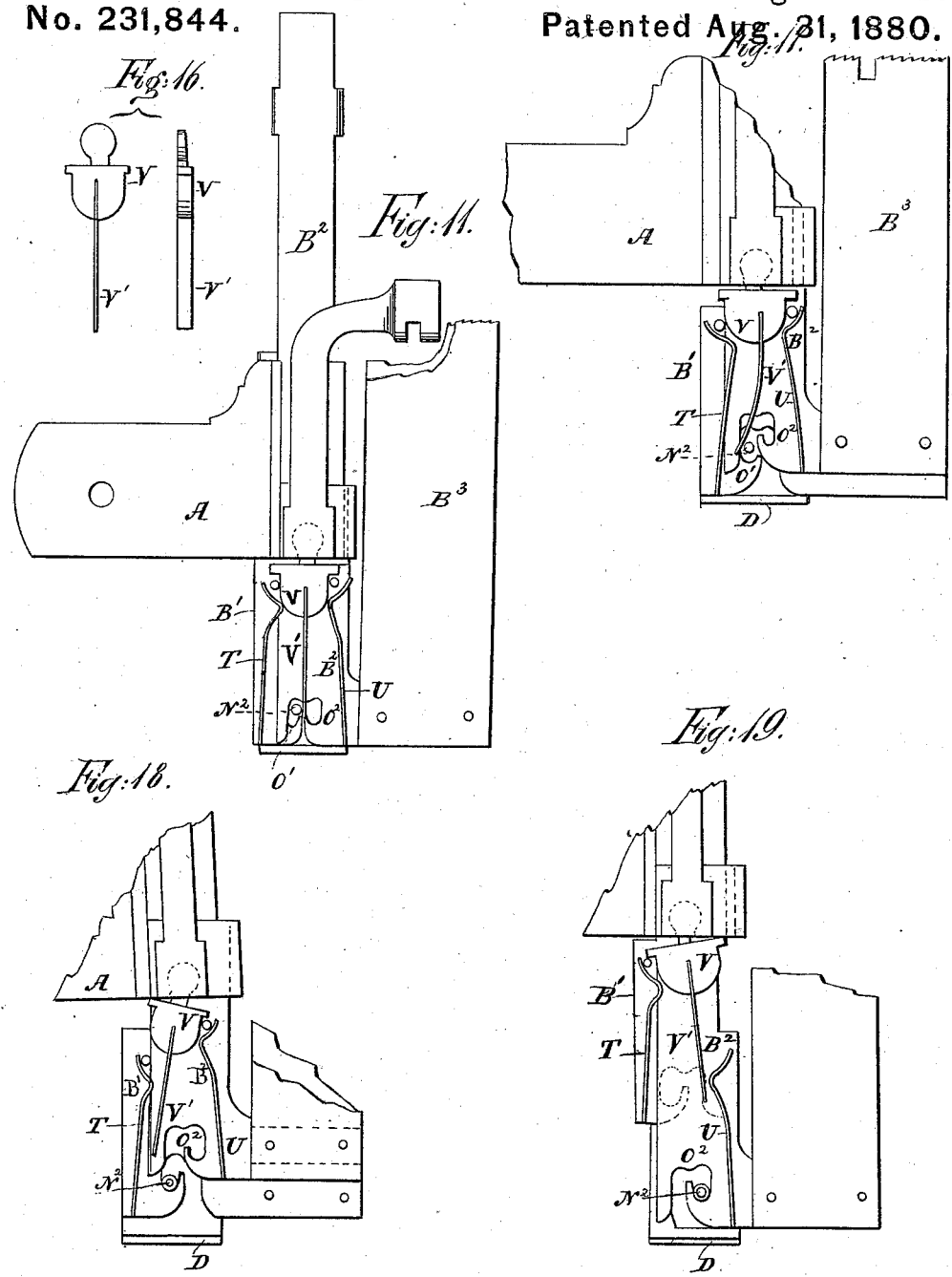

L. ONDERDONK.
Ruffling and Plaiting Attachment for Sewing Machines.
No. 231,844. Patented Aug. 31, 1880.

ed views of two latches, which serve to secure the work on the under sides of the devices to prevent the work-clamps from flying off when the device is in motion.

UNITED STATES PATENT OFFICE.

LANSING ONDERDONK, OF ADAMS' STATION, ASSIGNOR OF ONE-HALF OF HIS RIGHT TO CAMPBELL C. BROUN, OF BROOKLYN; SAID BROUN ASSIGNOR OF FIFTEEN ONE-HUNDREDTHS OF HIS RIGHT TO HENRY P. WELLS, OF BROOKLYN, N. Y.

RUFFLING AND PLAITING ATTACHMENT FOR SEWING-MACHINES.

SPECIFICATION forming part of Letters Patent No. 231,844, dated August 31, 1880.

Application filed January 13, 1880.

*To all whom it may concern:*

Be it known that I, LANSING ONDERDONK, of Adams' Station, in the county of Albany and State of New York, have invented a new and useful Improvement in Ruffling and Plaiting Attachments for Sewing-Machines, of which the following is a specification, reference being had to the accompanying drawings.

This invention relates to certain improvements in gathering and plaiting attachments for sewing-machines of that class in which reciprocating cloth-carriers or crimping-slides are employed to form the plaits or gathers in the material as it is carried between the needle-bar and lower stitch-forming devices of a sewing-machine; and it has for its object to provide an improved means for operating said carriers, as more fully hereinafter specified. This object I attain by the mechanism illustrated in the accompanying drawings, in which—

Figure 1:
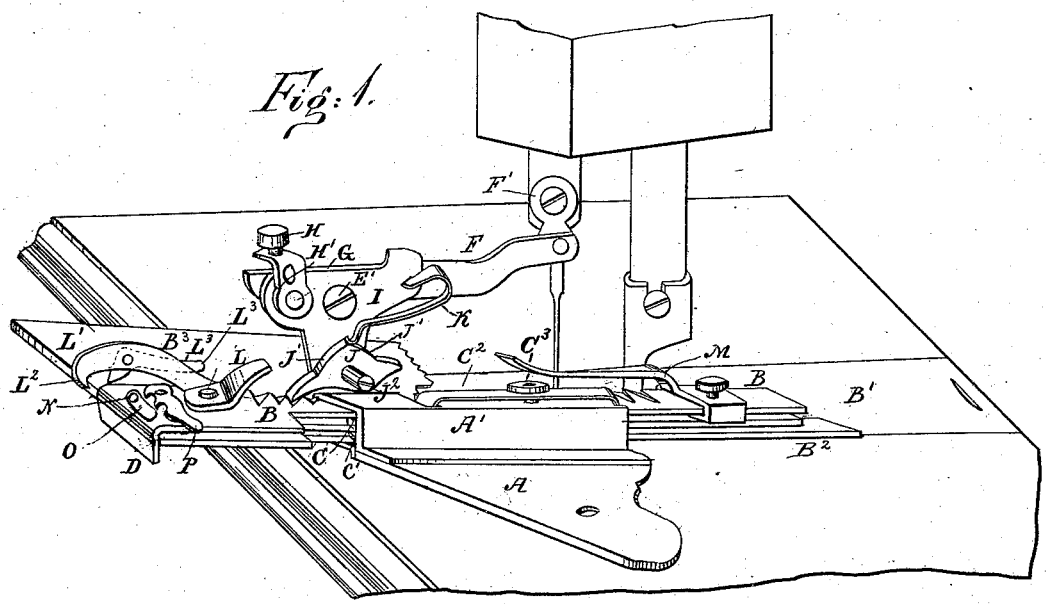
Figure 2:
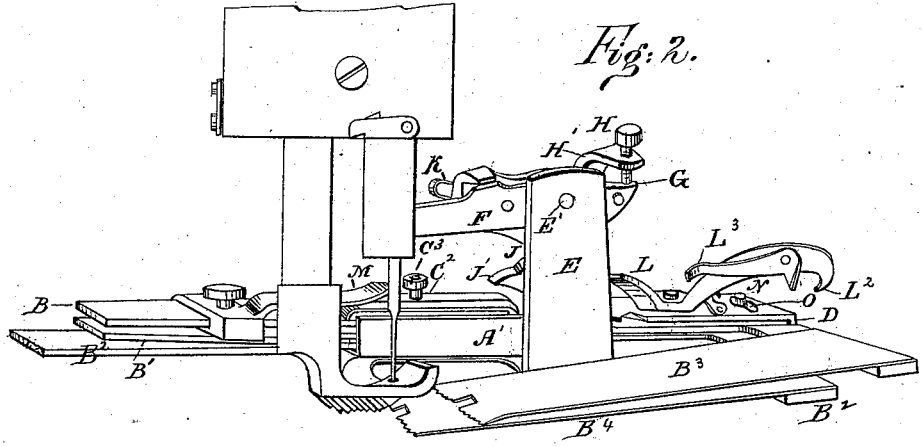
Figure 12:
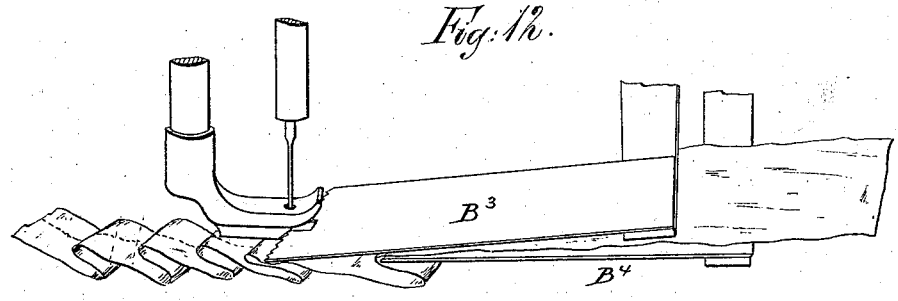
Figure 13:
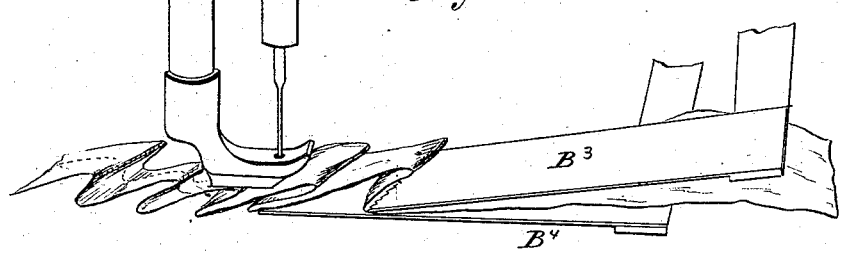

Figure 1 illustrates a perspective view of my device entire applied to a sewing-machine, looking at the front and right side of same. Fig. 2 represents a similar view, looking toward the rear and left side of the device. Figs. 3 and 3ª represent similar views, showing a modified form of my invention. Figs. 4 and 4ª represent the bed-piece which sustains and upon which travel the working parts of my device, and by means of which the device is attached to the machine. Fig. 5 represents a detached view of the main actuating-lever, which is connected to the needle-bar of a sewing-machine to operate the device. Fig. 6 represents a detached view of an auxiliary lever adjustably connected to the operating-lever, and which carries the pawl which operates a rack-bar to give motion to the cloth-carriers. Fig. 7 indicates a detached view of said pawl. Figs. 8ª, 8ᵇ, and 8ᶜ represent top, side, and bottom elevations of said rack-bar. Figs. 9ª and 9ᵇ represent top and bottom views of the slide carrying the upper cloth-carrier. Figs. 10ª and 10ᵇ represent similar views of the slide carrying the lower cloth-carrier. Fig. 11 represents a bottom view of the entire device. Fig. 12 represents a perspective view of the cloth-carriers detached and the presser-foot and needle-bar of the machine, showing the under cloth-carrier acting alone. Fig. 13 represents a similar view of said parts, showing the upper cloth-carrier acting alone, and Fig. 14 a similar view of said parts, showing the cloth-carriers acting alternately, resulting in alternate folds. Fig. 15 represents detached views of the shifting device or tumbler attached to the rack-bar of the attachment for alternately engaging the slides carrying the respective cloth-carriers. Fig. 16 represents detached views of a switch-lever, by means of which the position of the shifting device or tumbler is changed to operate the slides carrying the cloth-carriers alternately. Fig. 17 represents a detached bottom view of the device, showing the shifting device or tumbler and its operating mechanism in the position they assume just previous to shifting the pin on the tumbler from one cloth-carrying slide to the other. Fig. 18 represents a similar view, showing the switch-lever, shifting device or tumbler, and operating mechanism in the positions they assume just after shifting the pin on the tumbler from one cloth-carrier slide to the other. Fig. 19 shows a similar view, representing the cloth-carrying slides in their intermediate positions. Fig. 20 represents a perspective view of a rack-bar and modified form of cloth-carrying devices. Figs. 21 and 22 represent detached views of two friction guides or pads, one of which is located between the rack-bar and upper cloth-carrying slide and the other between the two cloth-carrying slides. Fig. 23 represents a detached perspective view of an adjustable stop adapted to be clamped on the rack-bar, and which serves to trip the double pawl to reverse the motion of said bar. Fig. 24 represents a device hinged to the end of one of the cloth-carrying slides for the purpose of more readily allowing the slides to be pulled out when they become by accident pushed in to the shoulders. Fig. 25 represents an edge elevation and perspective view of the rack-bar adapted to be placed edgewise between the cloth-carrying slides. Fig. 26 represents detached views of the respective cloth-carrying slides adapted to be placed on opposite sides of the rack-bar when said bar is placed edgewise upon the bed-plate between the said slides; and Fig. 27 represents a detached view of the pawl employed in the modified form of my invention.

In the drawings, A indicates a plate adapted to be secured to the bed of a sewing-machine, and provided with a right-angular extension, A', forming a recess in which the rack-bar and cloth-carrying slides move back and forth, as more fully hereinafter specified.

B indicates a rack-bar provided at one edge with a series of teeth, and adapted to travel back and forth in the recess formed by extension A'. A friction guide or pad, C, provided with shoulders $x\,x$, is placed between the rack-bar and upper slide, said guide or pad being of sufficient thickness to separate the slide from the rack-bar, in order to allow the shifting device or tumbler to operate freely. The intermediate teeth of said rack-bar are rectangular in form, while the teeth at each end are beveled or triangular. The wider end of said rack-bar terminates in a bent lip, D, as shown in the various figures of the drawings, for the purpose to be hereinafter more fully specified.

B' and $B^2$ represent two cloth-carrying slides, which travel in the recess of extension A', the lower slide, or slide $B^2$, rests on the bottom of the recess, and a friction guide or pad, C', similar to guide C, is placed between the slide B' and said slide $B^2$. These pads or guides C C' fit loosely, but are kept from moving back and forth with the slides by the square shoulders $x\,x$, and the object sought in having them fit loosely is that the friction-spring $C^2$ may transmit its pressure through said slides and friction-guides to the bottom of the recess, thereby avoiding all looseness or lost motion.

The tension of the spring $C^2$ is regulated by a thumb-screw, $C^3$, and the rear end of said spring rests upon the rack-bar B, back of extension A', and its forward end bears on said rack-bar through an opening in the top of said extension.

The bed-plate A is formed or provided with a vertical standard, E, which has fulcrumed to its upper end a lever, F, provided at one end with a connection, F', by means of which it may be attached to the needle-bar of a sewing-machine, and at the other end is provided with a bearing, G, which abuts against the end of the set-screw H, carried in a pivotal link, H', secured to one end of a supplemental lever, I, fulcrumed to the standard E by the pin E'. The said lever I carries on its lower arm a double pawl, J, provided with a double cam, J', on its upper side, against which is adapted to bear the spring K, attached to the lever I, so as to hold the pawl in either position to which it may be shifted. A plunger acted upon by a short spring may be used in place of spring K.

L indicates a curved trip pivoted to one end of the rack-bar B, and M an adjustable curved stop or trip secured to the other end of the said rack-bar, the said trips serving to trip the double-pawl J at each end of the stroke of the rack-bar, so as to reverse the motion of the same.

The rack-bar is provided at one end, on its lower side, with a pivoted tumbler or shifting device, N, Figs. $8^b$, $8^c$, and 15, which is provided on its upper face with a pin, N', projecting through a slot, O, in the rack-bar B. A toothed lever, P, attached to the rack-bar is adapted to engage the pin N', for the purpose of locking the shifting device or tumbler when desired. The said tumbler or shifting device is also provided on its under side with a pin or projection, $N^2$, which is adapted to engage the hooks O' and $O^2$ formed by the slots $O^3$ and $O^4$ in the respective cloth-carrying slides B' and $B^2$, carrying the cloth-carriers $B^3$ and $B^4$, as hereinafter specified.

The letters T and U indicate two springs attached to the under sides of the respective slides B' and $B^2$, and serving to alternately move the hinged piece or switch-lever V laterally to bring spring V' attached thereto into engagement with the pin $N^2$ on the shifting device or tumbler N, so as to shift said tumbler and cause its pin $N^2$ to engage alternately each cloth-carrying slide B' and $B^2$ at the end of the stroke of the rack-bar, so as to provide for alternately reciprocating said slides.

The adjustable trip M, secured to the rack-bar, may be moved back and forth upon said bar, and secured at any point thereon to operate in connection with the pawl J to trip the same and regulate the movement of the rack-bar. The pivotal trip L, which serves to reverse the pawl J at the other end of the travel of the rack-bar B, is provided with a long arm, L', the end of which has a hook, $L^2$, adapted to engage, in connection with a latch, $L^3$, the fulcrum-pin $J^2$ of the double pawl J and hold the parts in position, so as to cause the rack-bar and cloth-carrying slides to move together when the lever F is operated, making a series of short movements, thus causing the device to operate as a gather or ruffler instead of a plaiter.

In the modification illustrated in Figs. 3 and $3^a$ the rack-bar B and cloth-carrying slides B' and $B^2$ are turned up edgewise and arranged in a horizontal position, the rack-bar being between the two slides. In this case the friction-spring $C^2$ is located on the side of the extension A' instead of on the top.

The shifting devices in this modification are as follows: Two shifting devices or tumblers, $N^4$, are pivoted one on each side of the rack-bar B, and rest, when idle, on studs $n'$ on said rack-bar. Two pawls, T', pivoted to the opposite sides of the extension A', are adapted, by means of springs U', to operate in conjunction with the pins $n^2$ on the shifting devices or tumblers alternately, and connect each cloth-carrying slide with the rack-bar for the purpose of operating the cloth-carrying slides, as more fully hereinafter specified. These pawls T' are curved upwardly at their free ends, and are provided with shoulders $n^3$, adapted to engage the pins $n^4$ on the cloth-carrying slides for the purpose of preventing said slides from moving outward with the rack-bar under the influence of the friction caused by the spring $C^2$ when it is desired that said slides should remain at rest. The cloth-carrying slides with the hooks $O'$ $O^2$ at their ends act, in conjunction with the pins $n^2$ on the shifting devices or tumblers $N^4$ and the pawls T', shoulders $n^3$, and studs $n^4$, to alternately move the respective cloth-carrying slides, in order to form the folds thereon.

The operation of the shifting devices, as shown in the various figures, is as follows: When all the slides are pushed into the recess formed by extension A' of the bed-plate up to their shoulders (this being the natural position of the slides when my device is placed upon a sewing-machine) the rack-bar B receives motion from the needle-bar of the machine through the levers F and I and pawl J and begins to move away from the needle. The shifting device or tumbler N being pivoted to the rack-bar, it, with its pin $N^2$, moves with it. The pin, however, moves but a short distance before striking the hooks $O'$ and $O^2$ of the cloth-carrying slides B' and $B^2$. It will be seen in Fig. 11 nearly in contact with the hook on slide B', and for convenience I will follow it out as in contact with that slide, the operation in connection with slide $B^2$ being identical. As the pin $N^2$ continues to move after striking the hook on slide B' it carries said slide with it. Thereupon the spring U is no longer counterbalanced by the spring T, which moves out with slide B'. The spring U, bearing on the switch-lever V, pushes it over into position, as shown in Fig. 18. The rack-bar B, after moving outward its allotted distance, begins to return, and nearly at the commencement of this return movement the lip D on said rack-bar strikes against the end of the cloth-carrying slide B', which has been drawn out, thus forcing said slide to return with said rack-bar.

It will be observed (see Figs. 9ª and 10ª) that the slots $O^3$ $O^4$ in the ends of the cloth-carrying slides B' $B^2$ are so formed that the entrances to the hooks $O'$ $O^2$ are somewhat wider than the diameter of the pin $N^2$ on the shifting device or tumbler N. Said slots $O^3$ $O^4$ are also made sufficiently deep to allow a little play or looseness between the ends of the cloth-carrying slides and the lip D on the rack-bar. Thus on the return movement of the rack-bar, when the lip D comes in contact with the end of the cloth-carrying slide B', the pin $N^2$ on the shifting device or tumbler N, which is pivoted to said rack-bar, is released from engagement with the inner portion of the slot in the cloth-carrying slide, and said shifting device is then left free, so that its pin may be easily moved out of the path of the hook $O'$ and into the path of the hook $O^2$. When the pin $N^2$, upon its return, arrives within reach of the spring V' said spring strikes the pin $N^2$ so as to tend to force it toward the hook $O^2$. At the same time the bend in the spring T and the pin on slide B' force the switch-lever V to erect itself, as shown in Fig. 17, and consequently the spring V' is bent until the pin $N^2$ is clear of the hook $O'$, when the pin is thrown over into engagement with the hook $O^2$ in cloth-carrying slide $B^2$. The pin $N^2$ then acts on the slide $B^2$ in the same manner in which it acted on slide B', and so the operation continues. Thus it is seen why the slides B' and $B^2$ are carried back by the bend or lip D instead of by the pin $N^2$, and that when the upper slide, or slide B', acts the cloth folds toward the needle, and when the lower slide, or slide $B^2$, acts the cloth folds away from the needle, the result of this alternate motion of the two slides and their respective blades of cloth-carriers being box-plaiting, since it is made up of first a fold in one direction and then a fold in the other. If, however, it should be desired to fold all the plaits in one direction, it may be accomplished by locking the pin N' (which also locks the shifting tumbler N and its pin $N^2$) with the lever P when the pin N' is in one end of the slot O, and, as the pin $N^2$ cannot leave the hook of the slide it is engaged with when locked, that slide alone will continue to move out and in while the other remains at rest.

In plaiting, gathering, and ruffling with the folds always in one direction the slides B' $B^2$ and the shifting mechanism may be dispensed with and said slides attached to an appropriate arm connected directly to the rack-bar B and the bed A. This device is shown in Fig. 20, and has been found to answer the purpose very well.

If, by accident or otherwise, the slides should become pushed in to their shoulders (see Fig. 11) and the pin $N^2$ left without both hooks until the return of said pin, the attachment would be inoperative. To remedy this it will simply be necessary to pull out one of the slides B' or $B^2$ by hand until the pin $N^2$ passes the hook in the slide, and then push the slide back again; or one of the slides may be made, as shown in Fig. 24, with a hook, $a$, made of a separate piece, and hinged to the slide and held in position by a spring, $b$, so that when the pin N' is forced back it will spring the hinged hook aside until said pin is restored to its proper position. After the passage of the pin the spring will force the hinged hook back again and the attachment will become operative.

The combination of three slides, wherein one (the carrying-slide) moves continuously to and fro, transmitting its motion to the other two slides, which act upon the cloth, I regard as one of the principal features of my invention.

I am well aware that various devices other than those herein described for actuating the carrying-slide and of transmitting its motion to the slides which act upon the cloth may be employed, and I do not limit myself to those herein shown and described.

Figure 14:
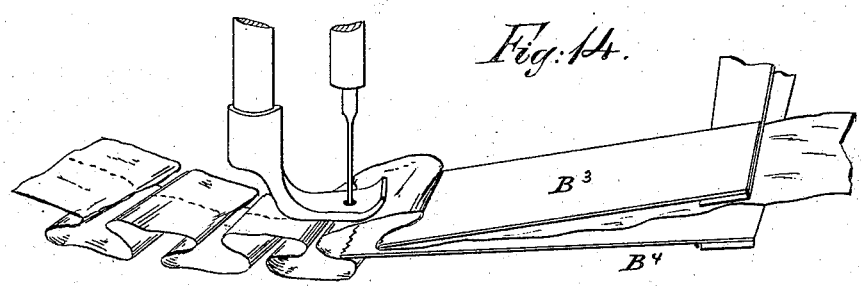

Having now described my invention, I will proceed to describe its operation. The cloth to be operated upon is placed between the cloth-carriers, as shown in Figs. 12, 13, and 14. If it should be desired to sew the work down on another piece of cloth or a garment, the cloth or garment is placed below the cloth-carriers and the material to be crimped or plaited. The stops or strips L and M being adjusted, as shown in Fig. 1, and the pin N' in the slot O unlatched, my device is then adapted to box-plaiting, (see Fig. 14,) since first the lower cloth-carrying slide, $B^2$, will move away from the needle and then toward it, forming a plait, as shown in Fig. 12, and having formed one plait, it will remain at rest, and the slide B' will form a plait, as shown in Fig. 13, and so on, each cloth-carrying slide and its blade or carrier acting alternately, the pin N' in the meantime oscillating from one end of the slot O to the other. When the pin is at the end of the slot nearest to the cloth-carrier $B^3$ the lower slide, $B^2$, will move, and when at the opposite end the upper slide will act, while the lower slide remains at rest.

In case some box-plaits have been formed and it is desired to vary them by a succession of single, knife, or side plaits, all that is necessary to do is to lock the pin N' at either extremity of the slot O, and, according to the desire of the operator, the forms shown in Figs. 12 or 13 will be produced; or he may wish to alternate any number of plaits shown in Fig. 12 with any number shown in Fig. 13, and, on unlocking the pin N', may again return to box-plaiting. (Shown in Fig. 14.)

The cloth-carriers move the cloth in the same direction as the feed of the sewing-machine. It is clear, then, that if both moved the cloth at the same rate no fold or plait at all would result, and the fold or plait is due and its amplitude governed by the excess of the motion given the cloth by the cloth-carriers over the motion given it by the feed. Therefore any change in the feed or in the length of the stitch will vary the fullness of the fold. Shortening the stitch without other change in the attachment will make the plait more full and the width apart from the plaits less—*i. e.*, by lengthening the stitch the machine feeds faster, but as the attachment does not the lap in the plait becomes less, and vice versa.

Again, the greater the motion of the lever I, controlled by the thumb-screw H, the greater the distance the pawl J will force the cloth-carrying slides to each rise and fall of the needle, and the greater will be the fold or lap in the plait. Thus the lap in the plait, and in a corresponding measure its width, can be varied by varying the motion of the lever I through the thumb-screw H, and also by varying the length of the stitch, and this without interfering with the stop or trip M; but a corresponding change in both the stitch and thumb-screw H will not alter the lap of the plait.

In adjusting the attachment the best practical direction is to adjust it by actual trial on a waste piece of cloth, remembering that increasing the distance traveled by the slide and diminishing the length of the stitch of the machine and the amount of lost motion by the thumb-screw H will increase the width of the plait.

In changing from plaiting to ruffling the pivotal trip L is swung around and the hook $L^2$ is hooked over the fulcrum-pin $J^2$, the latch $L^3$ being used to lock the hook upon the fulcrum-pin $J^2$. The double pawl J remaining idle, the rack-bar B is no longer operated by it; but said rack-bar is moved back and forth by the fulcrum-pin $J^2$ striking in its movements against the hook $L^2$ of the pivotal trip L and the latch $L^3$, said pivotal trip being attached to said rack-bar. The attachment is thus made to ruffle, the width of the ruffle being increased by taking up more or less of the lost motion between the levers F and I by regulating the thumb-screw H.

If, in the meantime, it is desired to do plain sewing, it is not necessary to remove the attachment, but simply throw it out of connection with the sewing-machine, which may be accomplished in two ways, viz: The swivel-stop L is set at right angles to the rack-bar B, and the pawl having fed said rack-bar in until its shoulders bear against extension A', it cannot reverse, and therefore slips back and forth over the slanting notches or teeth as the actuating-levers oscillate with the rise and fall of the needle-bar, without moving the slides at all; or the link H', carrying the thumb-screw H, may be turned downward over the end of the lever F, so that the short arm of said lever no longer strikes the screw H in its oscillating movements. I prefer, however, the former method.

In the modification of my device shown in perspective in Figs. 3 and $3^a$ the operation is as follows: When the parts are in the position shown in Fig. 3, with one of the pawls T' resting on the pin $n^2$ of one of the shifting devices or tumblers and disengaged from the pin $n^4$ on the cloth-carrying slide $B^2$, and the other pawl in the position shown in Fig. $3^a$, said slide $B^2$ will be free to be moved outward with the rack-bar B to the position shown in Fig. $3^a$.

It will be observed that the inner portion of the slots $O^3$ $O^4$ of the cloth-carrying slides in this modification form an acute angle with the longitudinal axis of said cloth-carrying slides, thereby making an incline. It will also be seen that the extreme ends of the cloth-carrying slides or outer portions of the hooks formed therein are provided with similar inclines. The purpose of these inclines will presently appear.

When the rack-bar has completed its outward movement and begins to return the friction between said rack-bar and the cloth-carrying slide B², induced by the spring C², will cause the pin n² on the shifting device N⁴ to mount the incline at the inner portion of the slot, thereby raising the pin n² out of its hook in the cloth-carrying slide and to the top of the slot, in which position it is held until after it has passed the end of the pawl T', which will hold it out of engagement with its hook when the rack-bar again moves outward. In the meantime the pin n² on the shifting device N⁴ on the opposite side of the rack-bar will be in the position shown in Fig. 3ª, and as the rack-bar moves inward said pin will ride up the incline on the outer portion of the hook of the cloth-carrying slide, thus being raised so that it may fall into said hook, and in so doing it will strike the under side of the pawl T', raising said pawl from engagement with the pin n⁴ on the cloth-carrying slide B', thus leaving said slide free to be moved outward with the rack-bar at the next outward movement of the latter. By repeating these operations the cloth-carrying slide will be operated alternately, fôrming box-plaiting such as is shown by Fig. 14.

If it is desired to move both of the cloth-carrying slides inward and outward simultaneously instead of alternately, it will only be necessary for the operator to place both pawls T' in the position shown in Fig. 3, which may be done simply by drawing out the rack-bar slightly and raising by the finger that one of the pawls T' which is in the position shown in Fig. 3ª, so that on returning the rack-bar to the position shown in Fig. 3 both pawls will rest on the pins n² of the shifting devices N⁴. When the device is so arranged both cloth-carrying slides will move out and in simultaneously, and then both will remain at rest, the rack-bar making the alternate round trips alone.

Having now described my invention, what I claim, and desire to secure by Letters Patent, is—

1. In combination with the actuating-levers, one of which is adapted to be attached to the needle-bar of a sewing-machine and to engage with the other, of the double pawl having reversely-inclined bearing-surfaces, and the spring K, adapted to bear against either face of said pawl, for the purpose of holding the pawl in position to operate in either direction a rack-bar provided with a series of teeth, the intermediate ones of which are rectangular, and the teeth at the extremities triangular and sloping toward each other, substantially as specified.

2. In a plaiting attachment for sewing-machines, the combination, with a rack-bar and mechanism for imparting an intermittent reciprocating movement thereto, of two cloth-carrying slides, intermediate devices connected to and moving with said rack-bar and adapted to engage said cloth-carrying slides, and mechanism for moving said intermediate devices into and out of engagement with said cloth-carrying slides, whereby the movements of the rack-bar may be transmitted first to one and then to the other, or simultaneously to both, of the cloth-carrying slides, substantially as described.

3. The combination, with the plate A and its extension A', of the rack-bar and cloth-carrying slides, the friction-spring adapted to bear upon said rack-bar, and the loose friction-guides, one of which is located between the rack-bar and upper slide and the other between the upper and lower slides, whereby the pressure of the said spring may be transmitted through said rack-bar, guides, and slides to the bottom of the recess of extension A', substantially as specified.

4. In a gathering and plaiting attachment, the combination of the rack-bar provided with a series of teeth inclined in opposite directions at opposite ends, the double pawl, mechanism for operating said pawl, and devices connected to and moving with said rack-bar for tripping said pawl, whereby the said pawl will slip and be prevented from feeding the rack-bar beyond a certain point in one direction, and upon being reversed will move the same in an opposite direction, substantially as specified.

5. In combination with the rack-bar, the lever carrying the double pawl, and the fulcrum-pin of said pawl, the pivotal trip L, the longer arm L' of which is provided with a hook, L², adapted to engage the fulcrum-pin of the double pawl, whereby the attachment may be made to ruffle or plait as desired, substantially as specified.

6. The combination, with the rack-bar having lip D and mechanism for reciprocating said rack-bar, the cloth-carrying slides provided with engaging-hooks, the shifting device or tumbler N, pivoted to the rack-bar and provided with a pin, N², the switch-lever V and its spring V', and the auxiliary springs T U, whereby the tumbler is shifted so that its pin N² may be alternately engaged by the hooks of the respective slides, substantially as and for the purpose specified.

7. In combination with the cloth-carrying slide and rack-bar, having the shifting device or tumbler provided with the pin N², a yielding hook secured to the end of said slide, whereby the said pin N² may be restored to its proper position, substantially as described.

8. In an attachment for sewing-machines, the toothed latch P, in combination with the shifting device or tumbler N, having pin N', and the rack-bar, whereby the pin on the shifting device is adapted to be locked by said latch and the shifting device prevented from oscillating, substantially as specified.

In testimony that I claim the foregoing improvement in gathering and plaiting attachments for sewing-machines, as above described, I have hereunto set my hand this 3d day of January, 1880.

LANSING ONDERDONK.

Witnesses:
HENRY P. WELLS,
H. B. TOMPKINS.